United States Patent [19]

Stahl et al.

[11] Patent Number: 5,055,330
[45] Date of Patent: * Oct. 8, 1991

[54] EDGE-REINFORCED FOLDED GLASS WOOL INSULATION LAYERS

[75] Inventors: Julia A. Stahl, Granville; Richard F. Hayden, Zanesville, both of Ohio

[73] Assignee: Owens-Corning Fiberglas Corporation, Toledo, Ohio

[*] Notice: The portion of the term of this patent subsequent to Jul. 11, 2006 has been disclaimed.

[21] Appl. No.: 357,833

[22] Filed: May 30, 1989

Related U.S. Application Data

[63] Continuation-in-part of Ser. No. 198,702, May 17, 1988, Pat. No. 4,847,127, which is a continuation-in-part of Ser. No. 904,440, Sep. 8, 1986, abandoned, which is a continuation-in-part of Ser. No. 789,532, Oct. 21, 1985, abandoned.

[51] Int. Cl.⁵ ............................................. B32B 3/00
[52] U.S. Cl. .................................... 428/61; 428/57; 428/58; 428/121; 428/192; 428/194; 428/233; 428/248; 428/285; 428/920
[58] Field of Search .................. 428/57, 58, 61, 121, 428/192, 194, 233, 248, 285, 920

[56] References Cited

U.S. PATENT DOCUMENTS 3,582,241 6/1971 Arduser ............................ 156/192

Primary Examiner—Pamela R. Schwartz
Attorney, Agent, or Firm—Patrick P. Pacella; Ted C. Gillespie

[57] ABSTRACT

A strip of reinforcing material is applied to an edge portion of a glass wool thermal insulation blanket. In a folded, two-layer unit, the reinforcing strip is applied to a major surface of one of the layers on an edge portion opposite the fold.

10 Claims, 2 Drawing Sheets

EDGE-REINFORCED FOLDED GLASS WOOL INSULATION LAYERS

This application is a continuation-in-part of application Ser. No. 07/198,702, filed on May 17, 1988, now U.S. Pat. No. 4,847,127, which is a continuation-in-part of application Ser. No. 904,440, filed Sept. 8, 1986, now abandoned, which is a continuation-in-part of application Ser. No. 789,532, filed Oct. 21, 1985, now abandoned.

TECHNICAL FIELD

This invention relates generally to glass wool thermal insulation blankets, and more particularly to insulation blankets for insulating wide spaces. Such blankets may be manufactured and shipped as either two layers hinged along one edge of each layer, or folded to form two layers.

BACKGROUND ART

U.S. Pat. No. 4,006,079 shows single-layer glass wool material for use in soaking up oil spills. The material is reinforced across its full width with scrim.

DISCLOSURE OF INVENTION

In accordance with the invention, two or more opposed glass wool insulation layers are provided by folding a blanket of unfaced glass wool insulation. At least one of the layers is provided with reinforcing material along an edge opposite the fold on at least one surface of the layer.

BRIEF DESCRIPTION OF DRAWINGS

The invention is more fully explained hereinafter, reference being had to the accompanying drawings wherein.

BEST MODE OF CARRYING OUT THE INVENTION

With reference to the drawings, each of FIGS. 1-4 shows two layers 30 and 32 of glass wool insulation joined together along one edge by a hinge-like fold 34.

Figure 1:
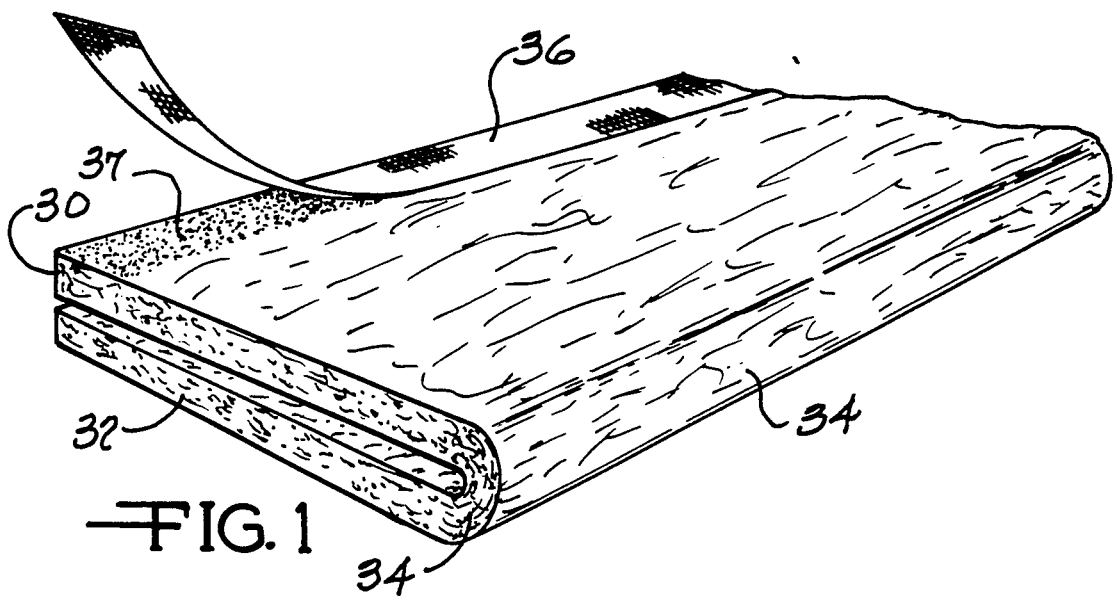
FIG. 1 is a fragmentary perspective view of two layers of glass wool insulation joined by a fold along one edge, one layer being reinforced along an edge opposite the fold on an outer surface in accordance with the invention.

In FIG. 1, a reinforcing strip 36, preferably made of kraft paper, is adhered by adhesive 37 to an outer surface of the layer 30, i.e., the surface thereof facing away from the layer 32, along an edge portion thereof opposite the fold 34.

Figure 2:
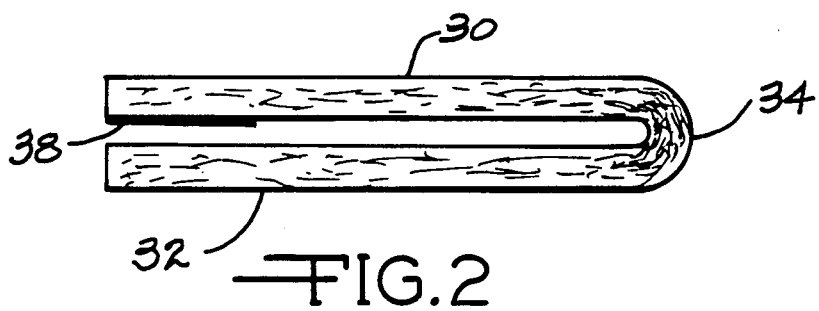
FIG. 2 is an end view of an alternative embodiment of the invention.

In FIG. 2, a reinforcing strip 38 is adhered to an inner surface of the layer 30, i.e., the surface thereof facing toward the layer 32, along an edge portion thereof opposite the fold 34. Unlike the embodiment illustrated in FIG. 1, the strip 38 is adhered to the same surface of layer 30 as the inner portion of the fold 34.

Figure 3:
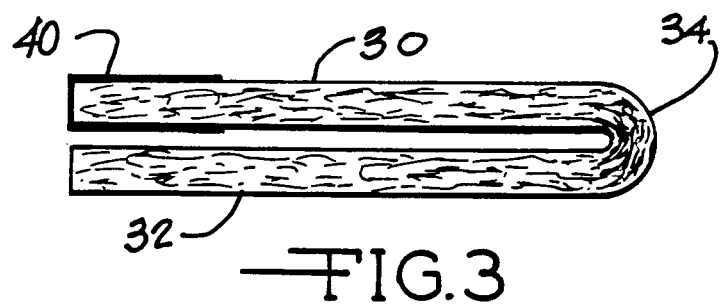
FIG. 3 is an end view of another alternative embodiment of the invention.

In FIG. 3, a reinforcing strip 40 is wrapped over and adhered to an edge portion of the layer 30 opposite the fold 34, covering the edge portion on inner and outer surfaces of the layer 30. Here again, as clearly shown in FIG. 3, one portion of the reinforcing strip 40 is applied to the same surface layer 30 as the inner portion of the fold 34.

Figure 4:
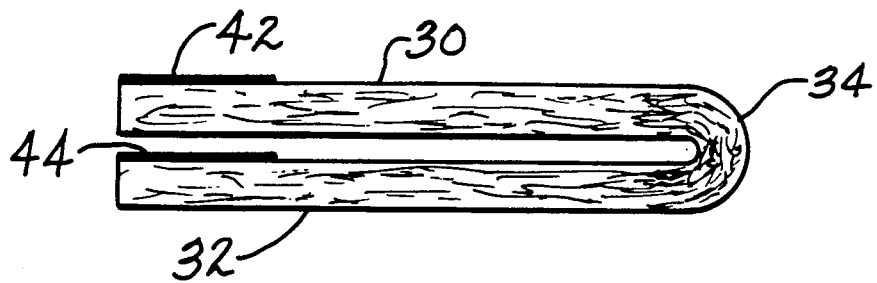
FIG. 4 is an end view of still another alternative embodiment of the invention.

In FIG. 4, a reinforcing strip 42 is adhered to an outer surface of the layer 30 along an edge portion thereof opposite the fold 34, and a reinforcing strip 44 is adhered to an inner surface of the layer 32 along an edge portion thereof opposite the fold 34, but on the same surface as the inner portion of the fold.

Figure 5:
FIG. 5 is an end view of yet another alternative embodiment of the invention.

While the invention is particularly advantageous for folded, two-layer glass wool insulation, it is also applicable to single layers or multiple layers. FIG. 5 shows a single layer 46 of glass wool insulation having a reinforcing strip 48 adhered to an edge portion of one of its major surfaces.

Figure 6:
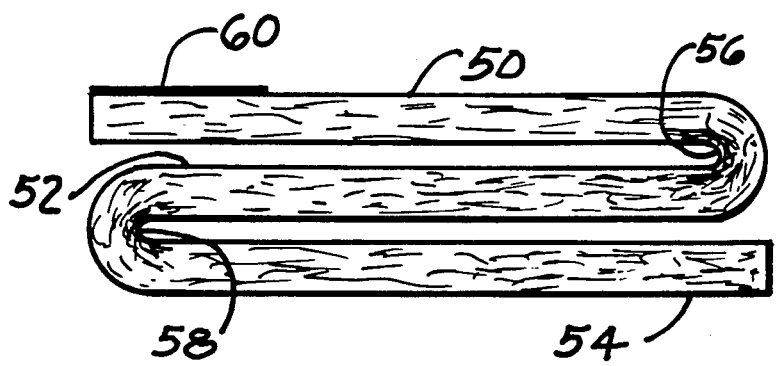
FIG. 6 is an end view of an embodiment of the invention having three layers.

FIG. 6 shows a blanket folded into three layers 50, 52 and 54, thereby defining folds 56 and 58. Layer 50 has reinforcing strip 60 to enable unfolding the blanket without pulling apart the glass wool.

The strips 36, 38, 42, 44, 48 and 60, may be about six inches to twelve inches wide and may be made of materials other than kraft paper, such as kraft paper-aluminum foil laminate, kraft paper-scrim-aluminum foil laminate, spun-bonded polyethylene, or plain scrim.

Unrestrained glass wool insulation normally has a density of less than one pound per cubic foot and large pieces are subject to being torn apart when handled by their edge portions. This problem is especially acute when layers such as layers 30 and 32 are unfolded about the fold 34 to provide a single layer twice as wide, for example, about twelve feet wide. As shown in the drawings, the glass wool is exposed at all surface areas of the blanket or layers of insulation except where covered by the reinforcing strip. The tearing problem is alleviated by the reinforcing strips.

Various modifications may be made in the structure shown and described without departing from the spirit and scope of the invention as set forth in the appended claims.

We claim:

1. A thermal insulation unit comprising a blanket of unfaced glass wool insulation which is folded into two or more layers and is adapted to be unfolded into the full size of said blanket, each of said layers having a density of less than one pound per cubic foot and a width sufficient to render the layer subject to being torn apart when handled by a longitudinal edge portion thereof, and a strip of reinforcing material adhered to a longitudinal edge portion of one of the major surfaces of one of said layers, said strip of reinforcing material being spaced transversely of the layer from the fold in the blanket, the glass wool of said layers being exposed at all surface areas, when the layers of the unit are in the unfolded condition, except where covered by said strip of reinforcing material, and said reinforcing material preventing the layer to which it is attached from being torn apart when handled by the longitudinal edge portion thereof having said strip of reinforcing material thereon.

2. A thermal insulation unit as claimed in claim 1 wherein said strip of reinforcing material is kraft paper.

3. A thermal insulation unit as claimed in claim 1 wherein said one major surface of said one layer is an outer surface facing away from the other of said layers when the layers of the unit are in the folded condition.

4. A thermal insulation unit as claimed in claim 1 wherein said one major surface of said one layer is an inner surface facing toward the other of said layers when the layers of the unit are in the folded condition.

5. A thermal insulation unit as claimed in claim 1 including a strip of reinforcing material adhered to the other major surface of said one layer along a free longitudinal edge portion thereof spaced transversely of the layer from the fold in the blanket.

6. In a thermal insulation unit comprising a blanket of unfaced glass wool insulation which is folded into two or more layers and is adapted to be unfolded into the full size of said blanket, each of said layers having a density of less than one pound per cubic foot, the improvement comprising a strip of reinforcing material adhered to at least one of the major surface longitudinal edges of one of said layers opposite the folded edge associated with said one layer to substantially reduce the tendency of the layer having the reinforcing strip from otherwise being torn apart when handled by that edge.

7. The insulation unit of claim 6 wherein two of said layers each have a strip of reinforcing material adhered to a major surface longitudinal edge.

8. The insulation unit of claim 6 wherein the reinforcing strip wraps around the longitudinal edge so that the strip is adhered to both major surfaces of the layer.

9. A thermal insulation unit comprising:

first and second elongate layers of glass wool insulation, each of said layers having a density of about less than one pound per cubic foot, each of said layers having two major surfaces, and the layers being joined along a common longitudinal edge at a fold; and a strip of reinforcing material adhered to a minor portion of one major surface of the first layer, the strip being positioned along the longitudinal edge of said one major surface opposite said common longitudinal edge, the surfaces of the first and second layers being exposed glass wool except for said minor portion of said one major surface joined to the reinforcement strip, the reinforcement strip being effective to substantially reduce the tendency of the first layer to be otherwise torn apart when handled by that edge.

10. The insulation unit of claim 9 wherein a second reinforcement strip is adhered to a minor portion of a major surface of the second layer, the strip being positioned along the longitudinal edge of said major surface of said second layer opposite said common longitudinal edge.

* * * * *